United States Patent
Miyanaga

(10) Patent No.: US 7,341,120 B2
(45) Date of Patent: Mar. 11, 2008

(54) BLADE EDGE STRUCTURE FOR CORE DRILL

(75) Inventor: Masaaki Miyanaga, Hyogo (JP)

(73) Assignee: Kabushiki Kaisha Miyanaga, Hyogo (JP)

( * ) Notice: Subject to any disclaimer, the term of this patent is extended or adjusted under 35 U.S.C. 154(b) by 0 days.

(21) Appl. No.: 10/539,815

(22) PCT Filed: Dec. 18, 2003

(86) PCT No.: PCT/JP03/16211

§ 371 (c)(1),
(2), (4) Date: Dec. 19, 2005

(87) PCT Pub. No.: WO2004/056521

PCT Pub. Date: Jul. 8, 2004

(65) Prior Publication Data

US 2006/0251482 A1  Nov. 9, 2006

(30) Foreign Application Priority Data

Dec. 20, 2002 (JP) .............................. 2002-369433

(51) Int. Cl.
*E21B 10/02* (2006.01)
(52) U.S. Cl. .................................... 175/403; 175/405.1
(58) Field of Classification Search ...... 175/403–405.1
See application file for complete search history.

(56) References Cited

U.S. PATENT DOCUMENTS 2,014,955 A  *  9/1935  Taylor ........................ 76/108.2
2,708,104 A  *  5/1955  McAllister ................... 175/255
3,308,896 A  *  3/1967  Henderson ................ 175/405.1
3,609,056 A     9/1971  Hougen
3,692,127 A  *  9/1972  Hampe et al. ........... 175/405.1

FOREIGN PATENT DOCUMENTS

JP  50-77991 A   6/1975
JP  SHO52-13592  1/1977

(Continued)

OTHER PUBLICATIONS

Translation of International Preliminary Report on Patentability dated May 28, 2004 for related International Application No. PCT/JP2003/016211 (5 pages).

(Continued)

*Primary Examiner*—Giovanna C Wright
(74) *Attorney, Agent, or Firm*—Marshall, Gerstein & Borun LLP

(57) ABSTRACT

A cutting portion structure of a core drill having diamond grains may affect deformation of a tip end portion of a cutting blade after extended use. A core drill A comprises cutting blades 2 formed at an opening end portion 4 of a cylindrical core body 1 and arranged in a circumferential direction of the core body to have gaps 3 between the cutting blades 2. As viewed from a direction substantially perpendicular to a cross-sectional view in a radial direction of the core body 1, the opening end portion 4 has an end face 4A which is rounded without edges, and diamond grains are bound on the opening end portion 4 which is rounded without edges from an inner peripheral side to an outer peripheral side, thereby forming the cutting blades 2.

5 Claims, 5 Drawing Sheets

FOREIGN PATENT DOCUMENTS

| | | |
|---|---|---|
| JP | 52-15832 B | 5/1977 |
| JP | SHO60-154106 | 10/1985 |
| JP | 4-325207 A | 11/1992 |
| JP | 06-24814 | 4/1994 |
| JP | 2358-1992 | 4/1994 |
| JP | 2000-233373 A | 8/2000 |

OTHER PUBLICATIONS

International Search Report for International Patent Application No. PCT/JP03/16211 by the Japanese Patent Office, dated Mar. 29, 2004.

* cited by examiner

BLADE EDGE STRUCTURE FOR CORE DRILL

CROSS-REFERENCE TO RELATED APPLICATION

The present application claims the benefit of priority of International Patent Application Ser. No. PCT/JP03/16211 filed on Dec. 18, 2003, which application claims priority of Japanese Patent Application Ser. No. 2002-369433 filed Dec. 20, 2002. The entire text of the priority application is incorporated herein by reference in its entirety.

TECHNICAL FIELD

The present invention generally relates to a core drill which is suitable for use in drilling holes with a relatively large diameter. More particularly, the present invention relates to a cutting portion structure of a core drill which is suitable for use in drilling holes with a large diameter in concrete, stone, etc.

BACKGROUND ART

Traditionally, in order to carry out drilling holes smoothly, a combination of a cylindrical core body provided with drilling cutting blades at a peripheral edge portion of an opening and a center drill provided at a center of the core body has been used as a core drill for use in drilling holes with a large diameter.

In such a core drill, first, the center drill drills a center hole, and thereafter, the core body rotates around the center drill positioned in the center hole to drill a large diameter hole which is a target hole around the center hole.

An exemplary construction for the cutting portion structure of the core drill of this type which is for use in drilling holes in concrete, stone, etc, is such that cutting blade chips which are made of cemented carbide or bound with diamond grains are embedded in concave portions formed in an opening end of the core body with appropriate gaps between them and attached thereto by brazing or the like (Japanese Patent No. 252057).

However, the core drill constructed such that the cutting blade chips including the diamond grains are attached on the periphery of the opening end of the core body is by far more expensive than other core drills, since expensive diamond grains are used in portions which are accommodated in the concave portions and do not perform cutting.

It is possible that the diamond grains are bound in a layered structure on an outer peripheral face, an inner peripheral face, and an end face of the opening end portion of the cylindrical core body. In that case, if such a core drill is used in drilling holes in concrete, stone, etc, the diamond grains in a region on which stress concentrate on tend to wear out and disengage from the core body in a relatively short time. As a result, the life of the core drill greatly decreases.

The present invention has been made under the circumstances, and an object of the present invention is to provide a cutting portion structure of a core drill which is capable of efficiently utilizing expensive diamond grains without wear or disengagement after a long-time use, and of thereby maintaining high cutting ability (drilling ability) for a long time period.

DISCLOSURE OF THE INVENTION

In order to achieve the above described object, a cutting portion structure of a core drill including a cylindrical core body; and cutting blades, comprises an opening end portion formed on the cylindrical core body, the opening end portion being rounded as viewed from a direction substantially perpendicular to a cross-section in a radial direction of the core body, wherein the cutting blades are formed at the opening end portion of the cylindrical core body and arranged in a circumferential direction of the core body to have gaps between the cutting blades, and the cutting blades include diamond grains bound on the opening end portion from an inner peripheral side of the core body to an outer peripheral side of the core body.

In accordance with the cutting portion structure constructed as described above, the diamond grains are bound on the opening end portion of the core body in a region from an inner peripheral face of the core body, through an end face of the opening end portion, and to an outer peripheral face of the core body, and the opening end portion of the core body is rounded without edges, it is possible to inhibit stress from concentrating on specified diamond grains.

For the above reasons, the diamond grains do not disengage from the core body, and do not locally wear. As a result, the drill bit can carry out drilling holes in an optimal condition for a long time period, and therefore can continue to drill a hole having a substantially perfect circle shape for a long time period.

In addition, since the cutting blades including the diamond grains are arranged with gaps between the cutting blades, the chips generated during drilling holes in concrete, stone, etc, can be discharged smoothly through the gaps.

In the cutting portion structure of a core drill, the opening end portion may be partially expanded in the radial direction to have a thickness larger than a thickness of a base end side portion of the core body which is closer to a base end of the core body than the opening end portion is, and the expanded portion of the opening end portion may be entirely rounded as viewed from the direction substantially perpendicular to a cross-section in the radial direction. In this construction, since it is possible to prevent the base end side portion of the core body from contacting the material in which the hole is being drilled, drilling holes is carried out with small cutting reactive force.

In addition, since a space is formed between the outer peripheral face of the core body and an inner peripheral face of the drilled hole, the chips resulting from cutting are discharged smoothly through the space.

As a result, the holes are drilled in concrete, stone, etc in a short time and under a small energy condition. Further, after the drilling, the core drill can be easily pulled up from the hole.

The cutting portion structure of a core drill may further comprise a step portion formed between the opening end portion and the base end side portion of the core body. The step portion increases the rigidity of the opening end portion of the core body and makes it possible to drill holes with a substantially perfect circle shape. In addition, the step portion scrapes up the chips to allow the chips to be discharged more efficiently.

The cutting portion structure of a core drill may further comprise a gallet formed on a portion of the core body which is located forward relative to the cutting blade in a rotational direction of the drill bit such that the gallet is located adjacent the cutting blade to allow chips resulting from cutting to be discharged therethrough. The gallet, along with the above mentioned construction cause the chips generated at the tip end portion of the cutting blade to be smoothly discharged from the tip end portion toward the outer peripheral face of the core body.

In the cutting portion structure of a core drill, the gallet may be structured such that a bottom portion thereof is located radially inward relative to an outer peripheral face of the core body, and an upper end portion of the gallet may form a face continuous with a base end side portion of the core body which is located above the gallet. Thereby the chips can be discharged smoothly.

The cutting portion structure of a core drill, may further comprise a protruding portion formed in a spiral shape on an outer peripheral face of the base end side portion of the core body which is located above the gallet to allow chips generated by the cutting blade to be discharged toward the base end. With such a cutting portion structure of the core drill, the chips are discharged efficiently.

BEST MODE FOR CARRYING OUT THE INVENTION

Hereinafter, embodiments of a core drill of the present invention will be described with reference to the drawings.

Embodiment 1

Hereinafter, a core drill according to a first embodiment of the present invention will be described with reference to the drawings.

Figure 1:
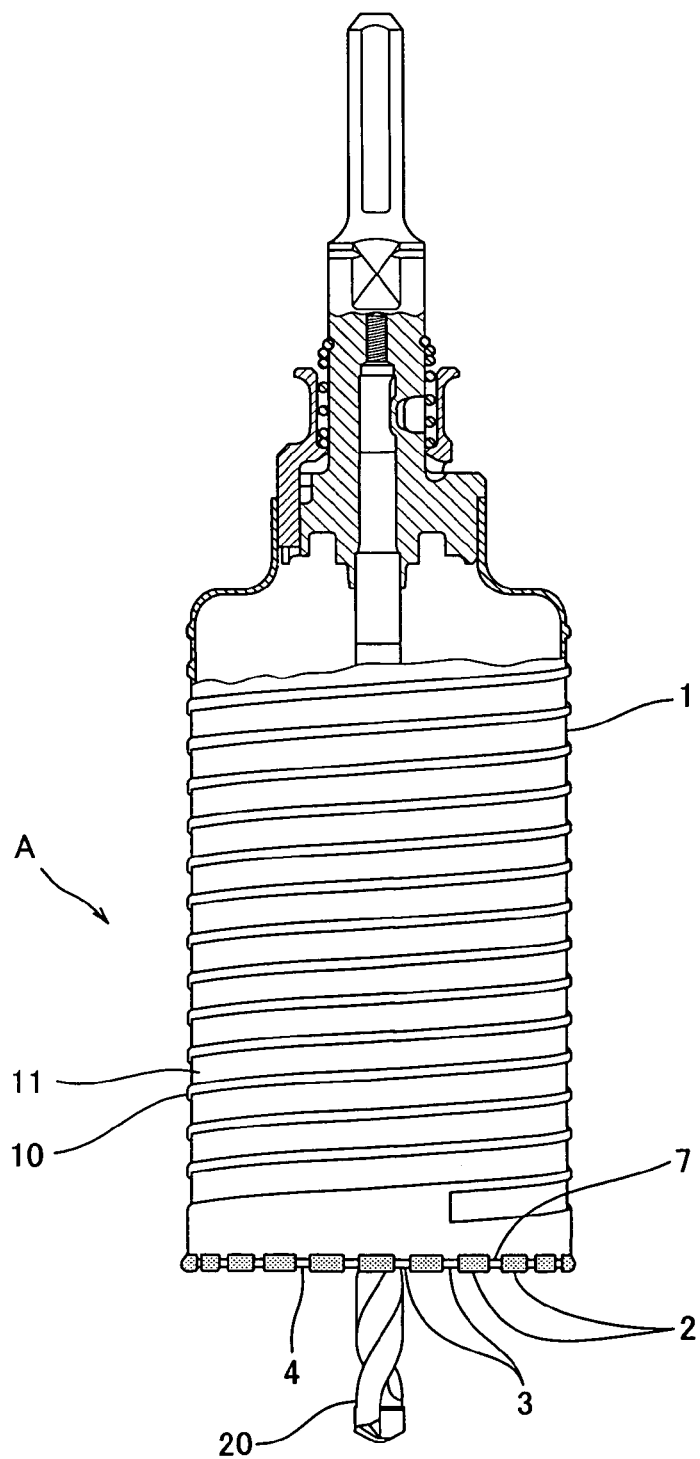
FIG. 1 is a partial cross-sectional front view showing a construction of an entire core drill according to an embodiment of the present invention.
Figure 2:
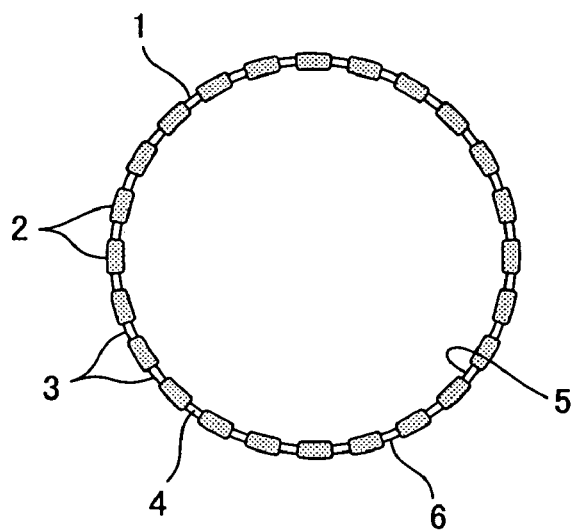
FIG. 2 is a bottom view showing arrangement of cutting blades including diamond grains of the core drill of FIG. 1.
Figure 3:
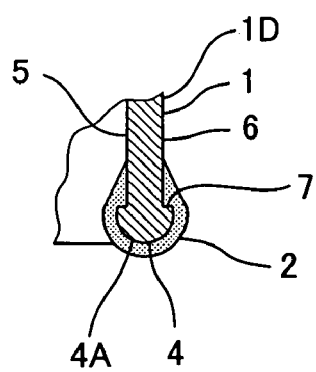
FIG. 3 is a partially enlarged cross-sectional view showing a detailed structure of the cutting blade.

As shown in FIGS. 1 and 2, a core drill A of this embodiment comprises a cylindrical core body 1 having an upper end portion with a reduced diameter and cutting blades 2 provided at an opening end portion 4 of the core body 1 and configured to perform cutting. The cutting blades 2 are formed at the opening end portion 4 of the core body 1 such that they are arranged in a circumferential direction of the core body 1 with predetermined gaps 3 of a predetermined dimension. As shown in FIG. 3, the cutting blades 2 are formed such that a plurality of diamond grains are bound in a range from an inner peripheral face 5 of the opening end portion 4, through an end face (opening end face)4A of the opening end portion 4, and to an outer peripheral face 6 of the opening end portion 4.

As shown in FIG. 3, in this embodiment, the opening end portion 4 of the core body 1 is partially expanded in a radial direction of the core body 1 to have a thickness larger than that of a base end side portion 1D of the core body 1 which is located closer to the base end of the core body 1 than the opening end portion 4 is, and its tip end portion 1s rounded in a semispherical shape as viewed from the direction substantially perpendicular to the cross-section 1n the radial direction. In addition, step portions 7 are formed between the opening end portion 4 and the inner peripheral face 5 of the base end side portion 1D and between the opening end portion 4 and the outer peripheral face 6 of the base end side portion 1D. The step portions 7 are formed such that the opening end portion 4 is partially expanded radially to increase diameter.

As shown in FIG. 3, the diamond grain is bound to cover a region from the inner peripheral face 5 of the base end side portion 1D, through the step portion 7 on the inner peripheral face 5 side, the end face 4A, and the step portion 7 on the outer peripheral face 6 side, and to the outer peripheral face 6 of the base end side portion 1D (upper end side in FIG. 3). Therefore, the diamond grain is bound in a semispherical round shape on the opening end side (lower end side in FIG. 3) to conform to an outer shape (cross-sectional shape) of the opening end portion 4. In other words, in this embodiment, the cutting blade 2 has a droplet shape as the cross-section in the radial direction 1s seen from forward in a rotational direction.

In an entire construction, as shown in FIG. 2, the cutting blades 2 are formed at the opening end portion 4 which is ring-shaped as seen in a bottom view of the core body 1 such that they are arranged with the gaps 3 in the circumferential direction as described above. In this embodiment, in order to enable smooth cutting and discharge of the chips resulting from cutting, a length of the gaps 3 in the rotational direction is set to a length of approximately ½ to ⅓ of the cutting blade 2. As the length of the gaps 3 increases, vibration and impact increase during cutting. Conversely, as the length of the gaps 3 decreases, discharge of the chips is not smoothly carried out.

A center drill 20 is provided at the center of the core body 1 to position a rotation center for drilling. In FIG. 2, the center drill is omitted.

When the core drill A constructed as described above is used for drilling holes in concrete, stone, etc, it functions as described below. Since an outermost end and an innermost end of each cutting blade 2 are located radially inward relative to the inner peripheral face 5 of the base end side portion 1D of the core body 1 and radially outward relative to the outer peripheral face 6 of the base end side portion 1D, respectively, and the tip end portion of each cutting blade 2 is formed in a semispherical shape (droplet shape) formed by a continuous face from the inner peripheral face 5 to the outer peripheral face 6, a cutting reactive force generated by cutting is applied to substantially uniformly to the tip end portion of each cutting blade 2. In other words, the cutting reactive force does not concentrate on a specified region of the cutting blade 2.

For the above mentioned reason, the diamond grains at the tip end portions of the cutting blades 2 do not partially disengage or wear out after a long-time use for drilling. As a result, the core drill A shows stable and well-balanced cutting performance. Since the core drill A performs cutting smoothly, the life of the core drill A is significantly improved.

In contrast to the base end side portion 1D of the core body 1, each cutting blade 2 is radially partially expanded to increase thickness, the inner peripheral face 5 or the outer peripheral face 6 of the core body 1 does not substantially contact the material in which the hole is being drilled, such as concrete or stone, only a minimum reactive force required for cutting is generated.

The chips resulting from cutting by each cutting blade 2 are smoothly discharged through the gap 3, through a sufficiently large space formed between the outer peripheral face 6 of the core body 1 and the material such as concrete or stone which is located radially outward of the outer peripheral face 6, and then to outside. In addition, since the step portions 7 scrape up the chips toward the base end of the core body 1, the chips are discharged more efficiently. In particular, when the core drill A is pulled up from the drilled hole after the cutting, the chips can be efficiently discharged from the hole.

Figure 6:
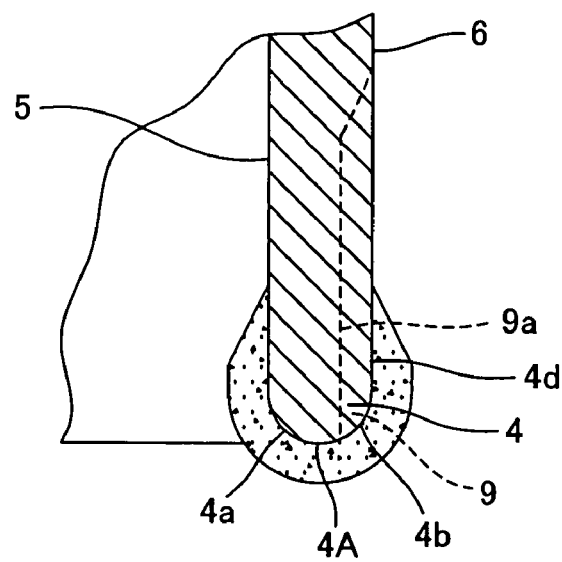
FIG. 6 is a partial cross-sectional view showing a detailed structure of a cutting blade having a structure different from that of FIG. 5.

While in this embodiment, the opening end portion 4 is radially expanded to increase thickness to form the step portions 7 between the opening end portion 4 and the base end side portion 1D of the core body 1, it may alternatively be configured not to be radially expanded, i.e., configured to be flat, without substantial step portion 7 as shown in FIG. 6. As a matter of course, the dimension of the step portions 7 may be reduced. The semispherical shape of the opening end portion 4 may be replaced by a shape shown in FIG. 6, in which an inner end 4a and an outer end 4b of the end face 4A of the opening end portion 4 is rounded without edges. Further, while the round inner end 4a and the round outer end 4b are coupled to form a curved line in the cutting portion structure in FIG. 6, the opening end portion 4 may be structured such that a straight-line portion is interposed between rounded portions with a curvature smaller than that of FIG. 6.

Embodiment 2

Figure 4:
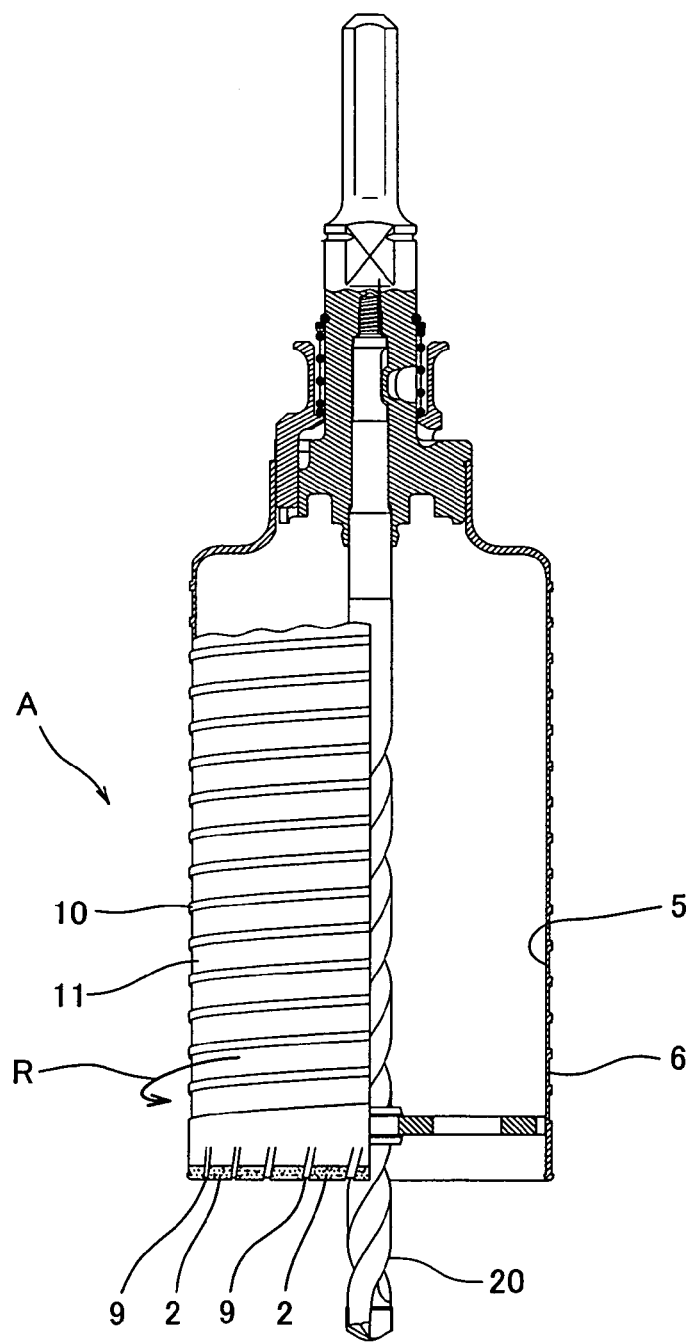
FIG. 4 is a partial cross-sectional front view showing a construction of a core drill according to another embodiment of the present invention.
Figure 5:
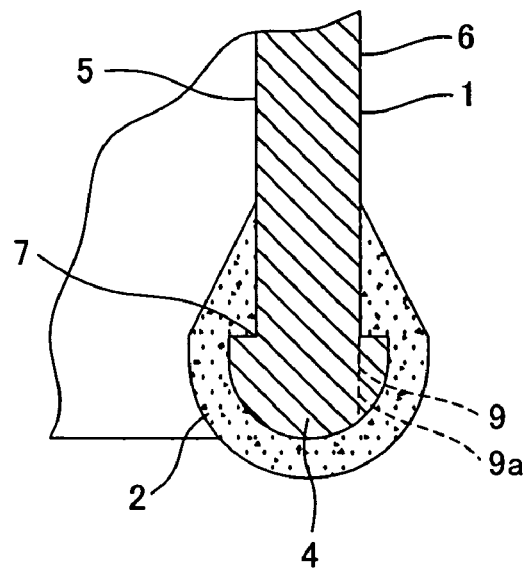
FIG. 5 is a partial cross-sectional view showing a detailed structure of the cutting blade including the diamond grain of the core drill shown in FIG. 4.

As a first alternative embodiment (second embodiment) of the first embodiment, as shown in FIG. 4 or 5, chip discharge gallets 9 are formed at portions of the core body 1 which are located forward of the cutting blades 2 in the rotational direction and adjacent the cutting blades 2 to enable the chips resulting from cutting by the cutting blades 2 to be discharged toward the base end (upward in FIG. 4) of the core drill A. In this embodiment, the gallet 9 is inclined such that its tip end (lower end in FIG. 4) is located forward in the rotational direction relative to the base end (upper end in FIG. 4) of the core drill A to enable the chips resulting from cutting by the tip end portion of the cutting blade 2 to be efficiently guided toward the base end.

In such a construction, the chips resulting from cutting by each cutting blade 2 are discharged through the gallet 9 located forward of the cutting blade 2, through a groove 11 formed on an outer peripheral face of the core body 1 to extend in a spiral shape, and to outside of the drilled hole. In FIG. 5, 9a denotes a bottom face of the gallet 9, which forms a flat face (face) continuous with the outer peripheral face 6 of the core body 1.

As shown in FIG. 6, the bottom face 9a of the gallet 9 may be formed by cutting an outer peripheral face 4d of the opening end portion 4 of the core body 1 radially inward (leftward in FIG. 6). Thereby, more chips are discharged toward the base end. In such a structure, an upper end portion of the gallet 9 is desirably gradually inclined radially outward so that the upper end portion becomes continuous with the outer peripheral face 6.

As shown in FIG. 1 or FIG. 4, it is preferable that a protruding portion 10 is formed on the outer peripheral face 6 of a portion of the core body 1 which is located above the tip end portion of the cutting blade 2 (or gallet 9) to protrude radially outward and to extend in a spiral shape to form a spiral groove 11, in order to efficiently discharge the chips. As a matter of course, the spiral shape is inclined toward the base end in a rearward region of the core body 1 in the rotational direction. In these embodiments, the protruding portion 10 is rectangular in cross-section, but is not intended to be limited to this. Further, two or more spiral grooves may be formed instead of one spiral groove shown in FIG. 1.

Figure 7:
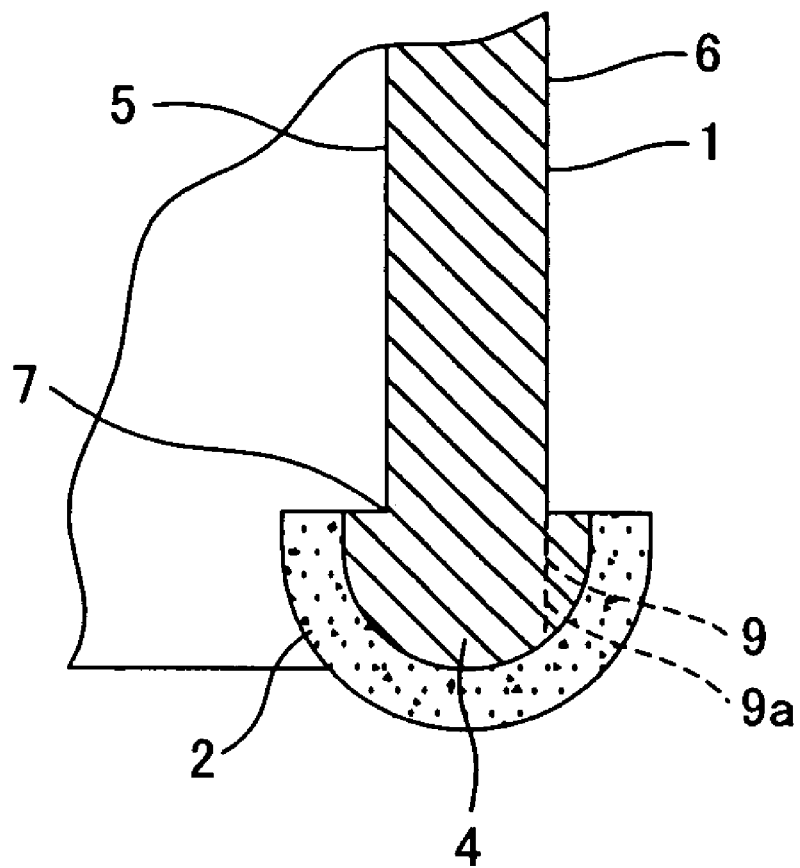
FIG. 7 is a partial cross-sectional view showing a detailed structure of a cutting blade having a structure different from those of FIGS. 3 and 5.

As shown in FIG. 7, as another alternative embodiment, a step portion 7 which is similar to that of the embodiment shown in FIGS. 3 and 5 may be desirably formed between the opening end portion 4 of the core body 1 and the inner peripheral face 5 of the base end side portion 1D of the core body 1 so as to be radially expanded, and the diamond grain may desirably be bound on only the opening end portion 4 (located lower in FIG. 7) to thereby form the cutting blade 2. When drilling is performed and the core drill A is pulled up from the drilled hole, the exposed step portion 7 scrapes up the chips toward the base end of the core body 1 to a greater degree. In FIG. 7, the same reference numerals as those in FIG. 5 denote the same or corresponding parts.

INDUSTRIAL APPLICABILITY

The present invention is applicable to drilling of materials to be ground, such as concrete, stone, tile, steel, or a composite material of these (e.g., concrete covering a surface of steel).

The invention claimed is:

1. A cutting portion structure of a core drill including a cylindrical core body; and cutting blades, the cutting portion structure comprising:

an opening end portion formed on the cylindrical core body, the opening end portion having a tip end portion rounded in a semispherical shape as viewed from a direction substantially perpendicular to a cross-section in a radial direction of the core body, wherein the cutting blades are formed at the opening end portion of the cylindrical core body and arranged in a circumferential direction of the core body to have gaps between the cutting blades, and the cutting blades include diamond grains bound on the opening end portion from an inner peripheral side of the core body to an outer peripheral side of the core body, wherein the opening end portion is partially expanded in the radial direction to have a thickness larger than a thickness of a base end side portion of the core body which is closer to a base end of the core body than the opening end portion is, and the expanded portion of the opening end portion is entirely rounded as viewed from the direction substantially perpendicular to the cross-section in the radial direction, the cutting portion structure further comprising a step portion formed between the opening end portion and the base end side portion of the core body to form a right angle between the step portion and the base end side portion.

2. The cutting portion structure of a core drill according to claim 1, further comprising:

a gallet formed on a portion of a tip end portion of the core body which is located forward relative to the cutting blade in a rotational direction of the core drill such that the gallet is located adjacent the cutting blade to allow chips resulting from cutting to be discharged therethrough.

3. The cutting portion structure of a core drill according to claim 2, wherein the gallet is structured such that a bottom portion thereof is located radially inward relative to an outer peripheral face of the core body, and an upper end portion of the gallet forms a face continuous with a base end side portion of the core body which is located above the gallet.

4. The cutting portion structure according to claim 3, further comprising:
a protruding portion formed in a spiral shape on an outer peripheral face of the base end side portion of the core body which is located above the gallet to allow chips generated by the cutting blade to be discharged toward the base end.

5. The cutting portion structure according to claim 2, further comprising:
a protruding portion formed in a spiral shape on an outer peripheral face of the base end side portion of the core body which is located above the gallet to allow chips generated by the cutting blade to be discharged toward the base end.

* * * * *